United States Patent [19]

Chen et al.

[11] Patent Number: 5,687,353
[45] Date of Patent: Nov. 11, 1997

[54] MERGING DATA USING A MERGE CODE FROM A LOOK-UP TABLE AND PERFORMING ECC GENERATION ON THE MERGED DATA

[75] Inventors: Chien Chen; Yizhi Lu, both of Fremont, Calif.

[73] Assignee: HaL Computer Systems, Inc., Campbell, Calif.

[21] Appl. No.: 397,912

[22] Filed: Mar. 3, 1995

[51] Int. Cl.[6] .............................. G06F 12/04; G06F 12/16
[52] U.S. Cl. ................ 395/482; 395/497.02; 395/182.04
[58] Field of Search ...................................... 395/495, 482, 395/497.02, 182.03, 470, 182.04

[56] References Cited

U.S. PATENT DOCUMENTS

| | | | |
|---|---|---|---|
| 5,295,080 | 3/1994 | Averill | 364/487 |
| 5,301,338 | 4/1994 | Yamaura et al. | 395/800 |
| 5,452,429 | 9/1995 | Fucco et al. | 395/182.04 |
| 5,459,842 | 10/1995 | Begun et al. | 395/250 |
| 5,471,597 | 11/1995 | Byers et al. | 395/421.05 |
| 5,488,691 | 1/1996 | Fucco et al. | 395/185.05 |

FOREIGN PATENT DOCUMENTS

| | | |
|---|---|---|
| 0 540 450 | 5/1983 | European Pat. Off. . |
| 0 418 457 | 3/1991 | European Pat. Off. . |
| 90/02373 | 3/1990 | WIPO . |

OTHER PUBLICATIONS

Anupama Hegde, "Error Detection and Correction with the IDT49C466", Microprocessors and Microsystems, vol. 18, No. 10, Dec. 1994, pp. 613–620.

Primary Examiner—Eddie P. Chan
Assistant Examiner—Reginald G. Bragdon
Attorney, Agent, or Firm—Fenwick & West LLP

[57] ABSTRACT

A system and method providing ECC protection for all data block sizes for which a computer system supports store (ST) accesses includes an access control logic unit which converts store accesses for small data block (≦64-bits) into read-modify (merge)-write accesses and a data merge logic unit which merges 64-bit data blocks retrieved by the load access with the small data block of the store access to create a new 64-bit data block. The data merge logic unit utilizes a merge code provided from a look-up table in a programmable logic array to perform the merging of the data blocks. An ECC generation logic unit processes the merged 64-bit data block, including the new small data block.

2 Claims, 5 Drawing Sheets

| SIZE[1:0] | OFFSET[2:0] | MERGE CONTROL[7:0] |
|---|---|---|
| 00 | 0– | 11110000 |
| 00 | 1– | 00001111 |
| 01 | 000 | 10000000 |
| 01 | 001 | 01000000 |
| 01 | 010 | 00100000 |
| 01 | 011 | 00010000 |
| 01 | 100 | 00001000 |
| 01 | 101 | 00000100 |
| 01 | 110 | 00000010 |
| 01 | 111 | 00000001 |
| 10 | 00– | 11000000 |
| 10 | 01– | 00110000 |
| 10 | 10– | 00001100 |
| 10 | 11– | 00000011 |

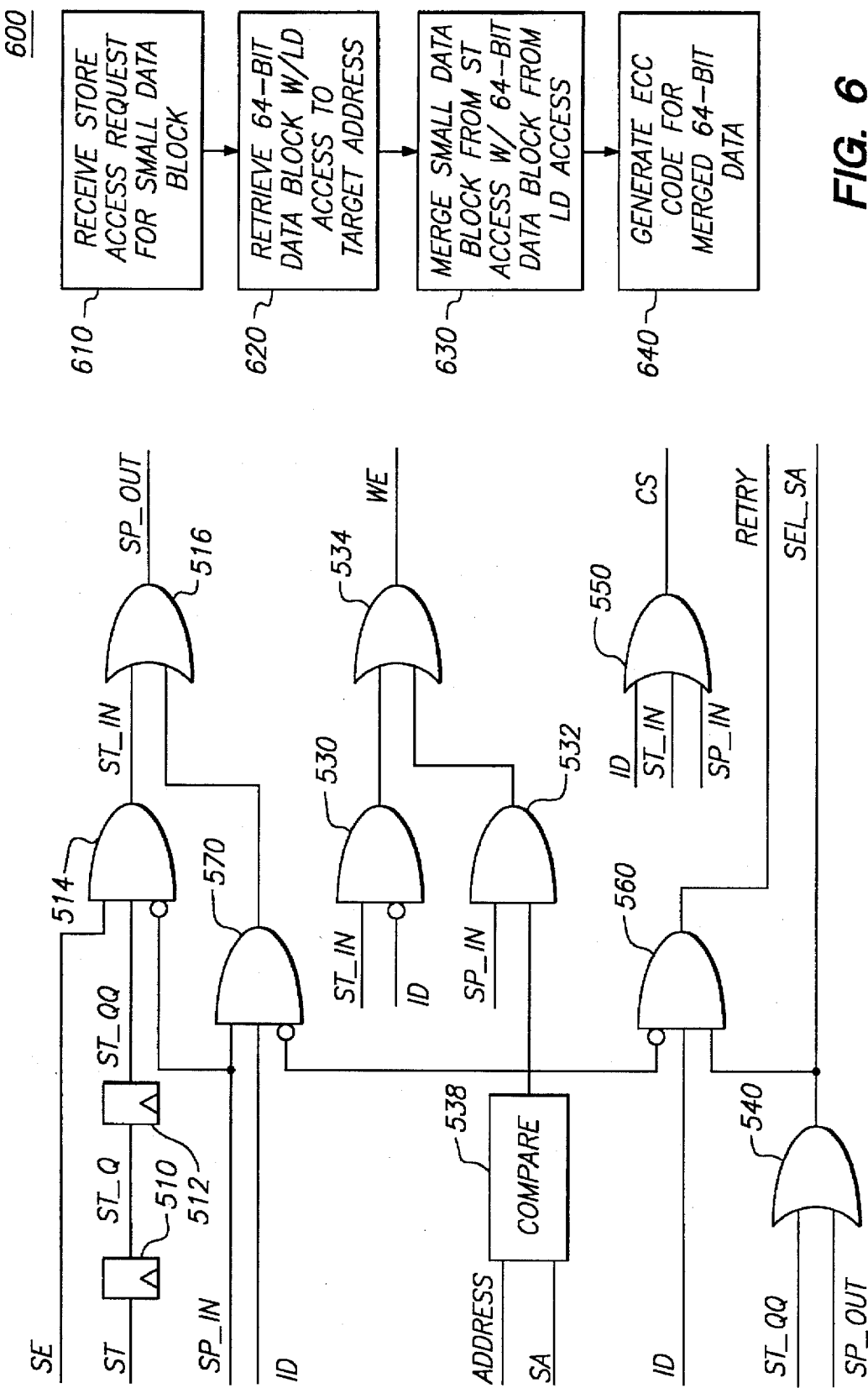

INPUT: D[63:0]
OUTPUT: C[7:0]

C[0] = D[0]^D[3]^D[5]^D[8]^D[11]^D[12]^D[16]^D[21]^D[25]^D[28]^D[33]^D[35]
       ^D[37]^D[39]^D[40]^D[42]^D[43]^D[44]^D[46]^D[47]^D[49]^D[50]^D[51]
       ^D[52]^D[54]^D[55]^D[57]^D[58]^D[60]^D[61].

C[1] = D[1]^D[4]^D[7]^D[9]^D[13]^D[17]^D[20]^D[23]^D[24]^D[27]^D[29]^D[32]
       ^D[34]^D[35]^D[36]^D[38]^D[39]^D[41]^D[43]^D[45]^D[47]^D[49]^D[50]
       ^D[51]^D[52]^D[54]^D[55]^D[56]^D[60]^D[61].

C[2] = D[1]^D[2]^D[7]^D[9]^D[10]^D[14]^D[18]^D[23]^D[27]^D[30]^D[33]^D[35]
       ^D[37]^D[39]^D[40]^D[41]^D[42]^D[44]^D[45]^D[46]^D[48]^D[49]^D[51]
       ^D[52]^D[53]^D[54]^D[56]^D[59]^D[62]^D[63].

C[3] = D[3]^D[5]^D[6]^D[11]^D[15]^D[19]^D[21]^D[22]^D[25]^D[26]^D[31]^D[32]
       ^D[33]^D[34]^D[36]^D[37]^D[38]^D[41]^D[43]^D[45]^D[47]^D[48]^D[49]
       ^D[51]^D[52]^D[53]^D[54]^D[58]^D[62]^D[63].

C[4] = D[1]^D[3]^D[5]^D[7]^D[8]^D[10]^D[11]^D[13]^D[14]^D[15]^D[16]^D[18]
       ^D[19]^D[21]^D[22]^D[24]^D[26]^D[27]^D[28]^D[29]^D[32]^D[35]^D[37]
       ^D[40]^D[43]^D[45]^D[48]^D[52]^D[57]^D[60].

C[5] = D[0]^D[2]^D[3]^D[4]^D[6]^D[7]^D[9]^D[11]^D[13]^D[14]^D[15]^D[16]
       ^D[18]^D[19]^D[20]^D[25]^D[27]^D[28]^D[29]^D[33]^D[36]^D[39]^D[41]
       ^D[44]^D[47]^D[49]^D[53]^D[56]^D[59]^D[61].

C[6] = D[1]^D[3]^D[5]^D[7]^D[8]^D[9]^D[10]^D[12]^D[13]^D[15]^D[16]^D[17]
       ^D[18]^D[20]^D[23]^D[24]^D[25]^D[26]^D[30]^D[31]^D[33]^D[34]^D[39]
       ^D[41]^D[42]^D[47]^D[50]^D[54]^D[59]^D[62].

C[7] = D[0]^D[1]^D[2]^D[4]^D[5]^D[6]^D[9]^D[11]^D[12]^D[13]^D[15]^D[16]
       ^D[17]^D[18]^D[22]^D[25]^D[27]^D[30]^D[31]^D[35]^D[37]^D[38]^D[43]
       ^D[45]^D[46]^D[51]^D[55]^D[57]^D[58]^D[63].

NOTE: ^ IMPLEMENTS THE FOLLOWING FUNCTION: A^B=Z
                                          0 0 0
                                          0 1 1
                                          1 0 1
                                          1 1 0
I.E. THE ^ IMPLEMENTS THE EXCLUSIVE OR FUNCTION

*FIG. 7*

MERGING DATA USING A MERGE CODE FROM A LOOK-UP TABLE AND PERFORMING ECC GENERATION ON THE MERGED DATA

RELATED APPLICATIONS

The subject matter of this application is related to the subject matter of the following applications:

application Ser. No. 08/388,602 entitled "CIRCUIT FOR SELECTIVELY DELAYING MICROPROCESSOR INSTRUCTION BASED ON RESOURCE AVAILABILITY", filed on Feb. 14, 1995 by Takeshi Kitahara;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow, now abandoned;

application Ser. No. 08/388,606 entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender now abandoned;

application Ser. No. 08/388,364 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender, now abandoned;

application Ser. No. 08/388,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow, now abandoned;

application Ser. No. 08/397,810 entitled "PARALLEL ACCESS MICRO-TLB TO SPEED UP ADDRESS TRANSLATION" filed on Mar. 3, 1995 by Chih-Wei David Chang, Kioumars Dawallu, Joel F. Boney, Ming-Ying Li and Jen-Hong Charles Chen, now abandoned in favor of application Ser. No. 08/772,835;

application Ser. No. 08/397,893 entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar, now abandoned;

application Ser. No. 08/397,891 entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey, now abandoned;

application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen A. Patkar, now U.S. Pat. No. 5,632,208;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow, now abandoned;

application Ser. No. 08/398,066 entitled "METHODS FOR UPDATING FETCH PROGRAM COUNTER" filed on Mar. 3, 1995 by Akira Katsuno, Niteen A. Patkar, Sunil Savkar and Michael C. Shebanow, now abandoned;

application Ser. No. 08/383,151 entitled "METHOD AND APPARATUS FOR RAPID COMPUTATION OF TARGET ADDRESSES FOR RELATIVE CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING A ZERO BIT STATUS FLAG IN A MICROPROCESSOR" filed on Mar. 3, 1995 by Michael Simone, now U.S. Pat. No. 5,638,312; and each of the above applications having the same assignee as the present invention, and each incorporated herein by reference in their entirety.

BACKGROUND OF THE INVENTION

1. Technical Field

This invention relates to the field of computer architecture and in particular to methods and systems for providing error correction code (ECC) protected cache memory without encumbering data accesses to cache memory.

2. Related Art

High performance computer systems often use pipelined cache systems with write-back designs to reduce store latency. These same systems use redundancy in the form of ECC protection to handle errors generated during data transfer and by memory damage due, for example, to alpha particle collisions. However, the requirements of ECC protection can interfere with cache data accesses, slowing down system operations and generating pipeline stalls.

ECC protection is normally designed for 64 bit or larger data blocks, while many computers implement store accesses for data block sizes ranging from 8 bits to 64 bits. Conventional systems, therefore, do not typically provide ECC generation for each data block size for which the computer supports store access. Some systems generate additional, i.e. non-64-bit ECC, bits for redundancy checking on data blocks smaller than 64-bits, but this approach requires additional memory space. Moreover, ECC generation methods generally require two memory accesses, which slows down system operations.

Therefore, there is a need for a system and method for providing ECC protection efficiently to all data block sizes for which a computer system supports store accesses.

SUMMARY OF THE INVENTION

The present invention is a system and method for organizing cache memory accesses to provide ECC protection for store accesses of all supported data block sizes without creating additional pipeline stalls or otherwise interfering with cache accesses. A system in accordance with the present invention comprises a cache random access memory (RAM) core, access control logic coupled to the RAM core for controlling cache accesses to the RAM core, and data merging logic and ECC generating logic which are also coupled to the RAM core. Cache load (read) and store (write) accesses are pipelined, with the load accesses given default priority over the store accesses. The target address of a pending store is maintained in a separate register that is monitored by the access control logic. A subsequent load access to this target address is detected by the access control logic, which forces the store access to complete immediately to avoid reading stale data.

When a small data block store (write) access is initiated, the access control logic treats the store access as an atomic read-modify-write access at the target address of the 64-bit data block that includes the small data block. The old memory image of the 64-bit data block is provided to the data merge logic by the read (load) access. The data merge logic includes multiplexers driven by a programmable logic array to combine (modify) the old 64-bit data block with the small data block provided to the data merge logic by the write (store) access of the atomic access. ECC generation for the resulting 64-bit data block, which includes the new small data block, proceeds by 64-bit ECC generation methods, and the modified 64-bit data block is written to the target address when the store access completes. A read-modify-write access with a 64-bit data block provides ECC generation in an efficient manner.

BRIEF SUMMARY OF THE DRAWINGS

FIG. 5 is a detailed diagram of the access control logic of FIG. 1

FIG. 6 is a flow chart of the method in accordance with the present invention.

FIG. 7 shows ECC generation equations suitable for the disclosed implementation.

DETAILED DESCRIPTION OF THE INVENTION

Figure 1:
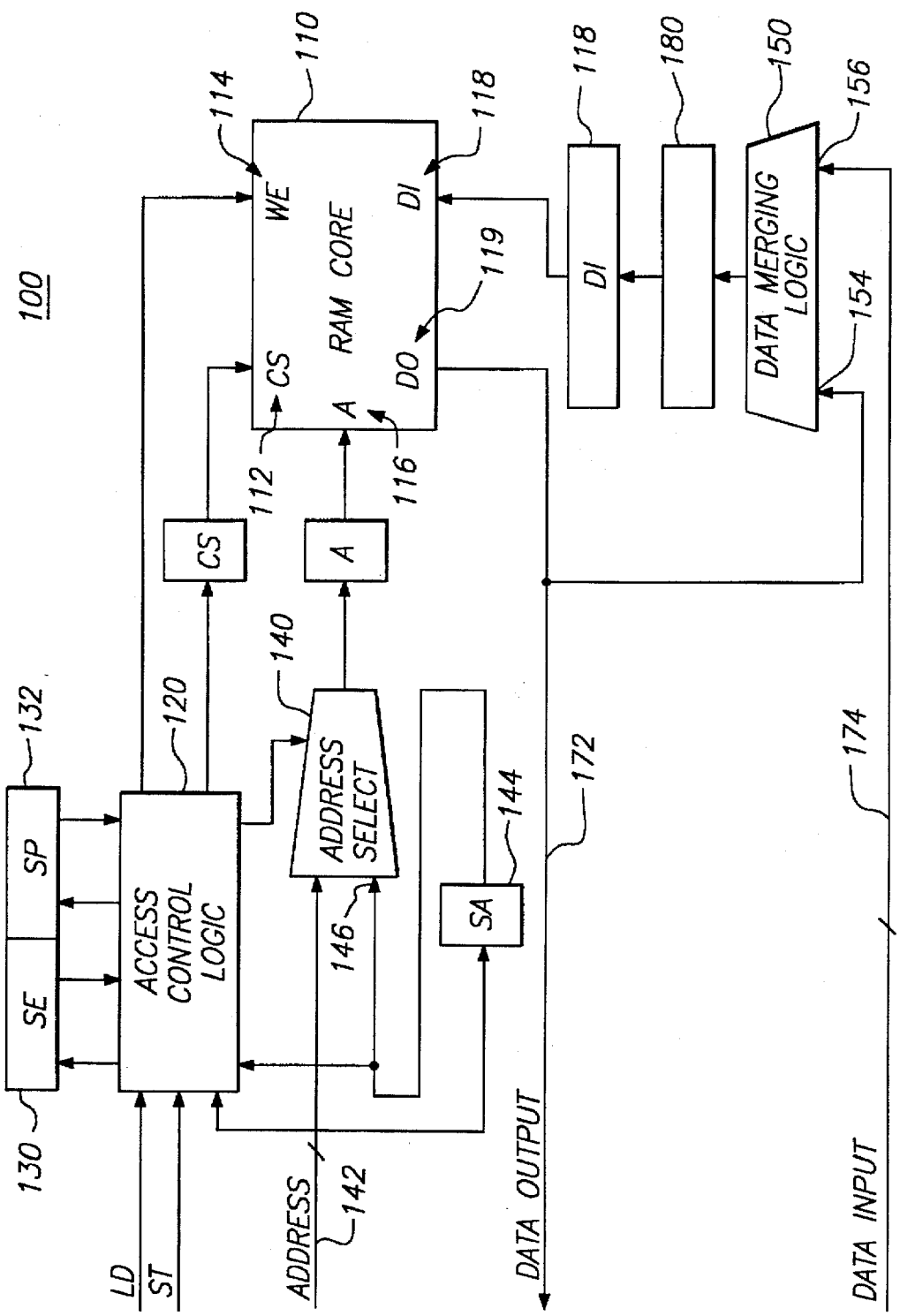
FIG. 1 is a block diagram of a bank of cache RAM including access control logic and data merging and ECC generating logic.

Referring to FIG. 1, there is shown a block diagram of a bank of a cache memory system 100 in accordance with the present invention. System 100 comprises a RAM core 110, access control logic 120, data merge logic 150 and ECC generation logic 180. RAM core 110 includes RAM access enable (CS), write enable (WE), address (A), and data input (DI) registers 112, 114, 116, 118, respectively, and a data output register (DO) 119. In the figure, buffers are labeled in accordance with their corresponding inputs.

Access control logic 120 regulates access to RAM core 110 by means of control lines to CS and WE registers 112, 114. Access control logic 120 is driven by LD and ST accesses from a processor (not shown) through ld and st signals, respectively. Store enable (SE) register 130 and store pending (SP) register 132 are coupled to access control logic 120 and are set and reset according to the sequence and target addresses of LD and ST signals. These signals are discussed below in conjunction with FIG. 2.

An address select multiplexer 140 has one input coupled to an address bus 142 and a second input coupled to a store-address (SA) register 144. When st is asserted (ST access) the target address on address bus 142 is loaded into SA register 144 and SP register 132 is set. A select enable ($sel_{13}$ sa) control signal is applied to multiplexer select input 146 by access control logic 120 to pass either the target address on address bus 142 or the target address in SA register 144 to address register 116. Access control logic 120 sets and resets $sel_{13}$ sa according to the sequence of LD and ST accesses, as described in greater detail below. In addition, access control logic 120 compares the target addresses in SA register 144 and on address bus 142. If the address are the same, access control logic 120 forces the pending ST access to complete to preclude reading a dirty data block, i.e. a data block that has been modified by an earlier but still pending ST access.

Data merge logic 150 includes a first input 154 coupled to DO 119 of RAM core 110 through an output data line 172 and a second input 156 coupled to an input data line 174 for receiving data from the processor. An output of data merge logic 150 is coupled to DI register 118 through ECC generating logic 180. This configuration allows data merge logic 150 to modify data read from RAM core 110 by a LD access using data written to RAM core 110 by a ST access. The resulting merged data is coupled to ECC generation logic 180 which performs standard 64-bit-ECC generation on the merged data prior to completing the ST access through DI register 118.

Figures 2A, 2B:
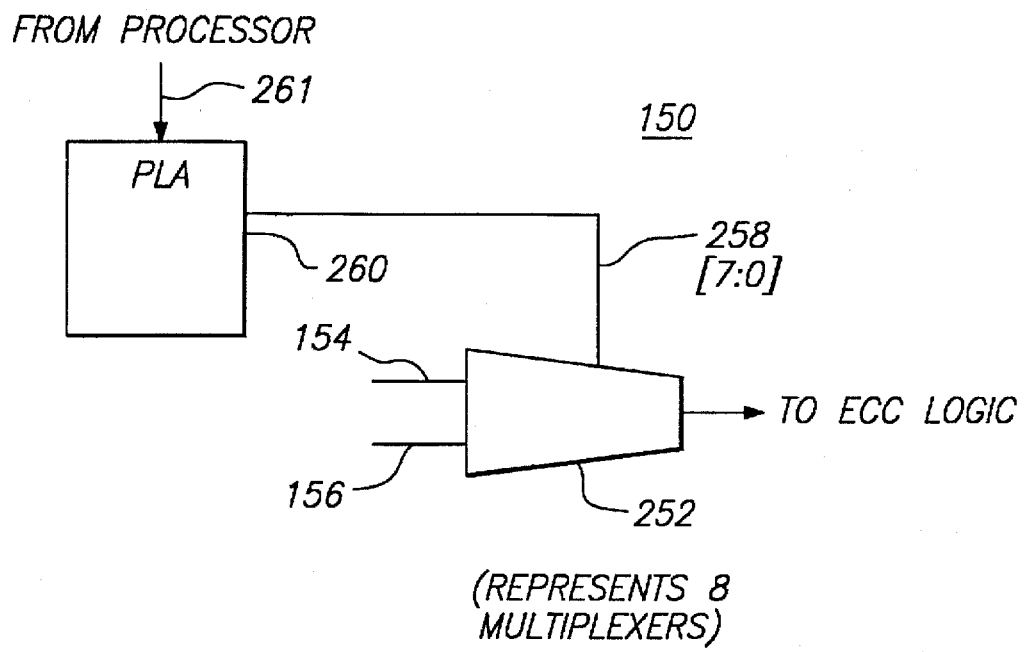
FIG. 2A is a block diagram of the data merge/ECC logic of FIG. 1
FIG. 2B is a representation of the look-up table in the programmable logic array included in the data merge/ECC logic of FIG. 1.

Referring now to FIG. 2A, there is shown a block diagram of data merge logic 150 in accordance with the present invention. Data merge logic 150 comprises eight dual input multiplexers 252, the inputs of which form inputs 154, 156 of data merge logic 150. The multiplexer select inputs 258 of multiplexers 252 are driven by a programmable logic array (PLA) 260, which receives data block size information from the processor through an input 261. Referring to FIG. 2B, there is shown a look up table 262 included in PLA 260. Look up table 262 includes a set of 8-bit merge codes 264 indexed by a set 266 of data sizes and a set 268 of data offsets, for driving select inputs 258 of multiplexers 252.

For ST accesses involving small data blocks (<64 bits) or for atomic accesses such as read-modify-write accesses, the processor couples data block size and offset information to PLA 260 through input 261. PLA 260 uses look-up table 262 to determine an appropriate merge code 264 and couples this merge code 264 to multiplexers 252. Multiplexers 252 merge the read, 64-bit data block at input 154 with the new data block at input 156 responsive to merge code 264 to form a new 64-bit data block. The new, merged 64-bit data block is coupled to ECC logic 180 where 64-bit ECC generation for the new 64-bit data block, including the small data block, is done. For a read-modify-write access, the new data block is 64 bits and the merge is effectively an overwriting of the data at input 154 with the data at input 156.

Figure 3:
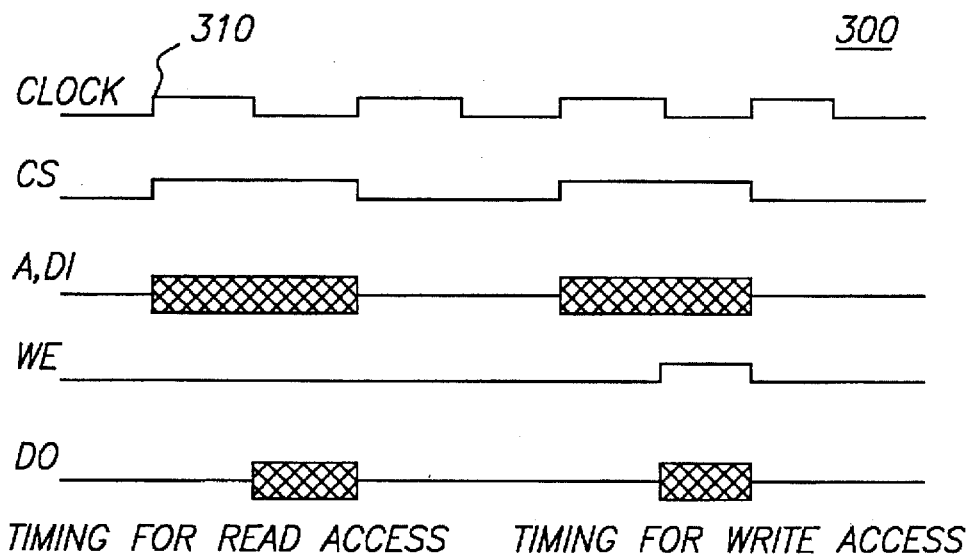
FIG. 3 is a timing diagram representing RAM access timing without the access control logic of FIG. 1

Referring now to FIG. 3, there is shown a typical timing diagram 300 for accessing RAM core 110, independent of timing modifications introduced by access control logic 120. For example, when a target address is coupled to A register 116 and CS register 112 is set at the start of a clock cycle 310, the data is available at DO 119 at the second half of the clock cycle. Similarly, when CS 112 is set and a target address and data are coupled to A register 116 and DI register 118, respectively, at the start of clock cycle 310, data is written to the target address when WE 114 is asserted at the second half of the clock cycle.

In order to insure that the CPU is used efficiently, the default condition for system 100 is that LD (read) accesses are performed before ST (write) accesses. This default condition is overridden under circumstances described in detail below. In order to implement both the default and override conditions, the basic timing diagram of FIG. 3 is altered by access control logic 130 as described below.

Figure 4:
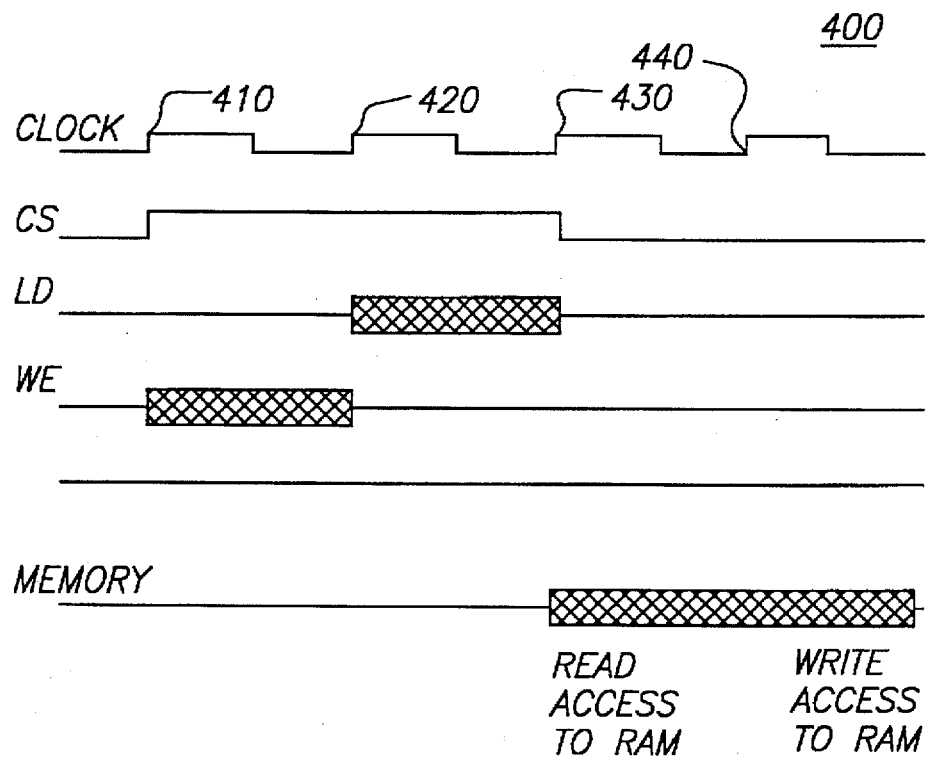
FIG. 4 is a timing diagram representing system access timing using the access control logic of FIG. 1.

Referring now to FIG. 4, there is shown a timing diagram 400 for system access to cache system 100 through access control logic 120. As indicated, both CS 112 and WE 114 are set at the start of a clock cycle 410 and LD 117 is set at the start of next clock cycle 420. Under access control logic 120, LD (read) access to RAM core 110 occurs one full clock cycle (430) after LD 117 is set and the data is available at DO 119 in that same cycle (FIG. 3). On the other hand, ST (write) access to RAM core 110 occurs at least two full clock cycles following assertion of ST 115 at 440. As indicated in FIG. 3, the data is written in the same cycle that ST access is granted. Moreover, because of the default condition described above, ST access to RAM core 110 may be postponed for additional clock cycles if additional LD accesses are asserted before the ST access is granted.

Referring now to FIG. 5, there is shown a schematic diagram of access control logic 120 for prioritizing and implementing LD and ST accesses to RAM core 110 (FIG. 1). Throughout the specification, signals are indicated in small letters and the registers to which they are applied are indicated by corresponding capital letters. The LD/ST default priority discussed above is implemented by AND gate 530 and OR gate 534. For example, ST access is granted (we is asserted) when st_in is asserted (SA 130 is set) and ld is not asserted (no LD access pending).

The timing delays for ST accesses indicated in FIG. 4 are implemented by first and second latches 510, 512 as follows. When ST is set, st is asserted at the input of first latch 510, which asserts st_q on the next clock cycle to the input of second latch 512. Second latch 512 asserts st_qq on the subsequent clock cycle, producing st_in at the output of AND gate 514 two clock cycles after st is asserted. In the absence of a LD access, st_qq thus causes the ST access to complete at the target address in SA register 144 by means of AND gate 530 and OR gate 540.

The other inputs of AND 514 are se, which is asserted when SE 130 is set, and sp_in negated. The output of AND 514, st_in, is applied to one input of OR 516. The output of OR 516, sp_out, is used to set and clear SP register 132. Thus, when sp_in is asserted, sp_out, resets SP register 132 when ld is not asserted and compare logic 538 is not asserted. If ld is asserted, however, sp-out sets SP register 132 since a ST access will be delayed by the priority scheme.

An OR gate 550 ensures that CS register 112 is set (RAM access enabled) whenever the processor requests a LD access (ld asserted) or a ST access (st_in two clock cycles after st) or when a ST access is pending (sp_in asserted). OR gate 540 asserts sel_13 sa to pass the target address in SA register 144 to A register 116 in RAM core 110 in the case of a ST access or when sp_out is asserted. The ST access will complete as long as we remains asserted. However, if a LD access intervenes, the ST access will remain pending.

The default priority of LDs may create a condition in which a LD access is issued to a target address after a pending ST access modifying the contents of the address is generated. In order to prevent LD accesses of stale data, compare logic 536, AND 532, and OR 534 operate to force a pending ST access to complete when the target address asserted on bus 142 equals the target address in SA register 144. As a result, ST accesses to a target address will complete before a subsequent LD access to the same target address is processed. For this purpose, SP register 132 is set and sp_in is asserted whenever a ST access is received. By applying sp_in and the output of compare logic 536 AND gate 532, WE is enabled immediately, allowing the ST access to complete to the target address without waiting one or two clock cycle for st_qq. Note that a LD access does not disable WE when sp_in is asserted and the address compare is true, i.e. the output of compare logic 536 is asserted, as it does when st_in is asserted.

Since each cache memory bank system 100 (FIG. 1) can store only a single target address in SA register 144, control access logic 120 also provides a way to force a ST access if a ST access is received while an earlier ST access is still pending. For this purpose, AND gate 560 force a LD access to be repeated (retry asserted) when ld is asserted at the same time different target addresses are on bus 142 and in SA register 144 and either st_qq or sp_out is asserted. When, for example, the target addresses are the same, the LD access proceeds with the target address in SA register 144.

Referring now to FIG. 6, there is shown a flow chart of method 600 for ECC generation implemented by the combination of access control logic 120, address select 140, data merge logic 150, ECC logic 180, and RAM core 110. Process 600 is initiated when a ST access request for a small data block is received 610. Responsive to the ST access, the 64-bit data block currently stored at the target address of the ST access is retrieved 620, using a LD access. Small data block of the ST access is then merged 630 with the 64-bit data block retrieved by the LD access from the target address to form a new, 64-bit data block. 64-bit ECC is then generated 640 for the merged, 64-bit data block that now includes the small data block.

Referring now to FIG. 7, there are shown ECC generation equations suitable for the disclosed 64-bit system. It is understood that while the invention has been disclosed for a system employing 64-bit data blocks, it can be readily altered to accommodate 8, 16, 32, 128, et seq bit data.

Thus, a method and system have been presented for providing ECC protection to all data block sizes for which a system supports store accesses, using a single ECC generation scheme. The method uses data merge logic coupled to the input and output buffers of the RAM core of a memory system in combination with a type of read-modify-write access to combine small block data ($\leq$64-bit data block) from a ST access with 64-bit block data retrieved by a LD access to memory. The merged data, including the small block data, is then ECC protected using standard 64-bit ECC logic. The method naturally supports atomic read-write-modify accesses, when the ST access data block is a 64-bit data block.

What is claimed is:

1. A cache memory system including ECC protection for all supported data store accesses, the system comprising:

a RAM core memory having control registers, an address input, a data input and a data output;

an access control logic unit having inputs for receiving load and store access signals and coupled to the control registers of the RAM core memory, for controlling access to the RAM core responsive to the received load and store access signals;

a programmable logic array having an input for receiving data store access information, an output, and including a look-up table for providing a merge code at the output responsive to the received data store access information;

a data merge logic unit having a first data input coupled to the data output of the RAM core memory, a second data input coupled to receive input data, a select input coupled to the output of the programmable logic array, and a data output, for combining data from the RAM core output with the received data at the second data input responsive to the merge code received from the programmable logic array; and an ECC generation logic unit having a data input coupled to the data output of the data merge logic unit for receiving the data combined from the RAM core output and second data input, and a data output coupled to the data input of the RAM core memory unit, for performing standard ECC generation on the received combined data.

2. A method for handling ECC generation for all data block size store accesses supported in a memory system including a look-up table that has a selected data block size and an ECC generating process suited to the selected data block size, the method comprising the steps of:

receiving a store access request at a target address in the memory system for a data block having a size less than the selected data block size;

generating a load access request at the target address to retrieve a stored memory image at the target address having the selected data block size;

determining an appropriate merge code for the data block having a size less than the selected data block size from the look-up table;

combining, through the use of the merge code, the data block from the store access request with the retrieved data block having the selected data block size to form a new data block having the selected data block size; and generating ECC for the new data block having the selected data block size using the ECC generation process suited to the selected data block size.

* * * * *